United States Patent [19]

Gunsallus

[11] Patent Number: 5,409,183
[45] Date of Patent: Apr. 25, 1995

[54] HELICOPTER WITH LEADING EDGE SERVO FLAPS FOR PITCH POSITIONING ITS ROTOR BLADES

[75] Inventor: Clifford T. Gunsallus, North Canton, Conn.

[73] Assignee: Kaman Aerospace Corporation, Bloomfield, Conn.

[21] Appl. No.: 103,892

[22] Filed: Aug. 6, 1993

[51] Int. Cl.$^6$ ........................................ B64C 27/615
[52] U.S. Cl. .................................. 244/17.13; 416/24
[58] Field of Search ............... 244/17.11, 17.13, 17.25, 244/82; 416/24

[56] References Cited

U.S. PATENT DOCUMENTS

| | | | |
|---|---|---|---|
| 2,455,866 | 12/1948 | Kaman | 416/24 |
| 2,936,836 | 5/1960 | Ellis . | |
| 3,095,931 | 7/1963 | Peiffer et al. . | |
| 3,109,496 | 11/1963 | Ellis, III et al. | 416/24 |
| 3,129,769 | 4/1964 | Hofbauer et al. | 416/24 |
| 3,589,831 | 6/1971 | Lemnios et al. . | |
| 3,795,375 | 3/1974 | Lemnios . | |
| 3,927,306 | 12/1975 | Miller | 244/17.13 |
| 4,029,271 | 6/1977 | Murphy et al. | 244/17.13 |
| 4,461,611 | 7/1984 | Michel . | |
| 4,899,641 | 2/1990 | Khan . | |

FOREIGN PATENT DOCUMENTS 44988  12/1931  Denmark .............................. 416/24

Primary Examiner—Galen L. Barefoot
Attorney, Agent, or Firm—McCormick, Paulding & Huber

[57] ABSTRACT

In a helicopter having a main rotor with blades controlled in pitch by servo flaps the servo flaps are arranged in advance of the leading edges of the blade to provide increased lift efficiency of the rotor system. The signals for controlling the pitches of the blade are generated by a computer implemented means responsive to pilot command signals and flight parameter signals and are transmitted from the stationary structure of the helicopter to the rotating structure through a non-mechanical stationary-to-rotary interface. An active stabilization system is associated with each rotor blade to overcome the instability previously associated with leading edge servo flaps and to reduce the complexity of the control signals needed to be produced by the control signal generating means.

6 Claims, 4 Drawing Sheets

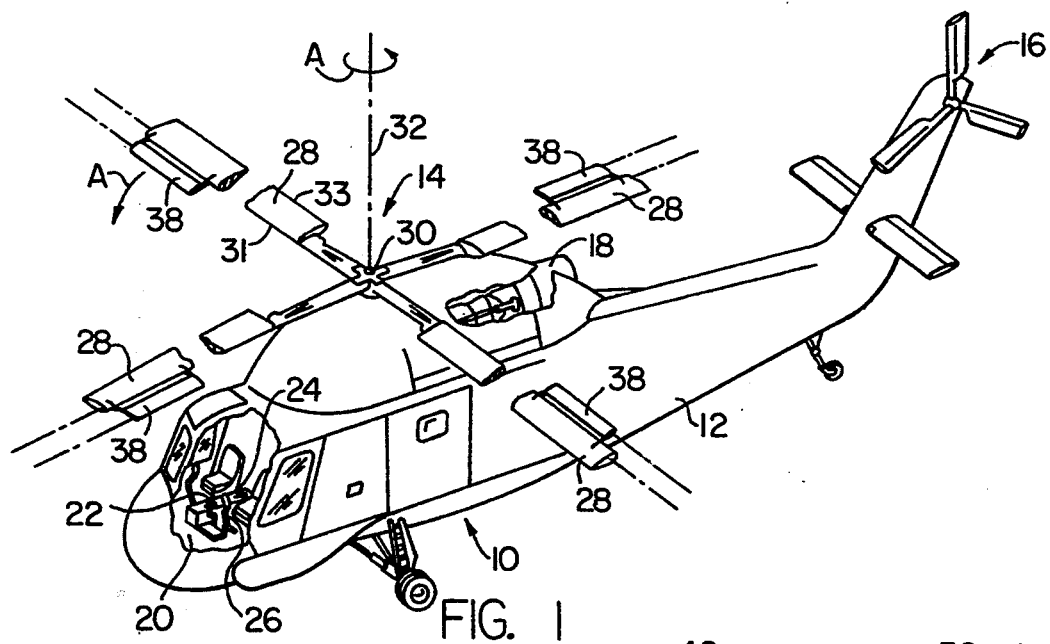
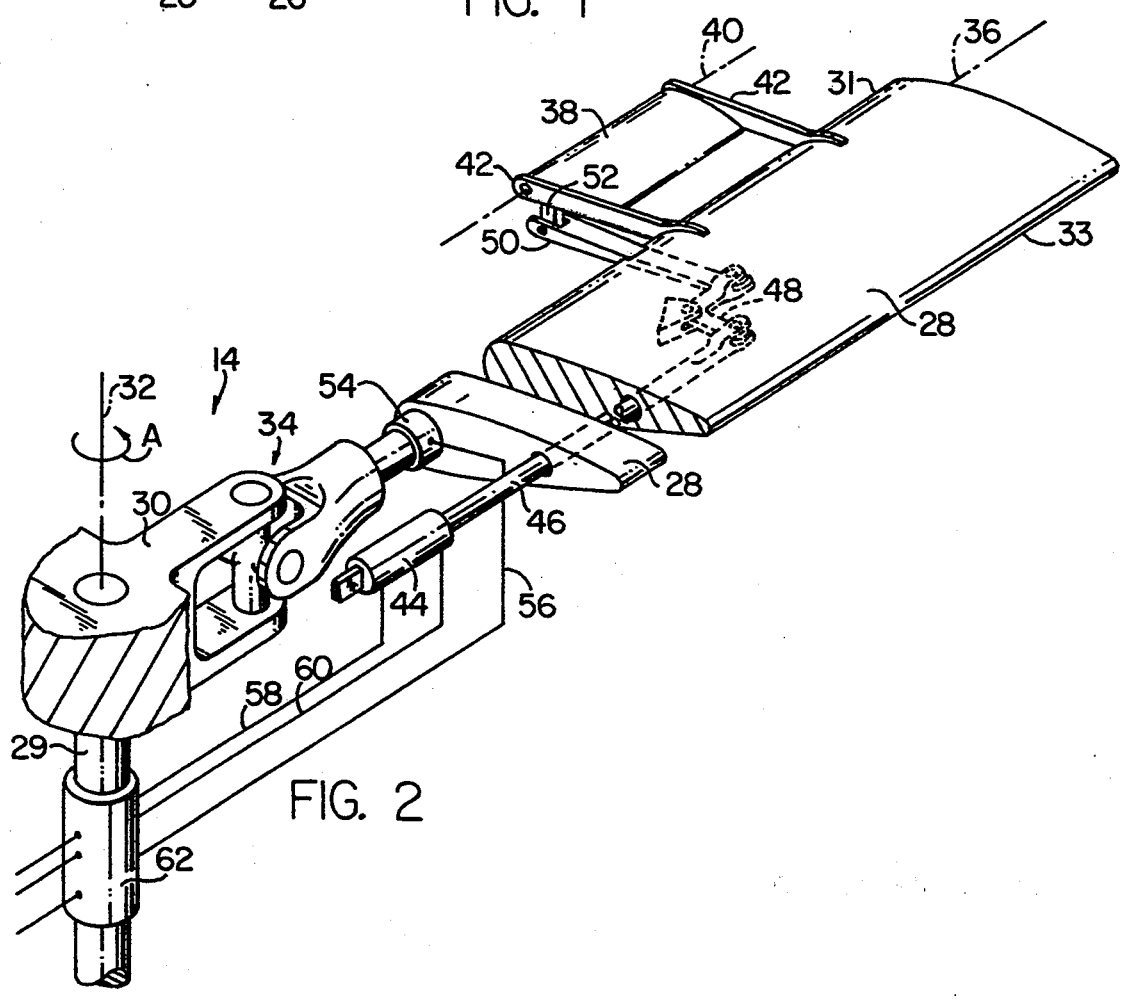

HELICOPTER WITH LEADING EDGE SERVO FLAPS FOR PITCH POSITIONING ITS ROTOR BLADES

FIELD OF THE INVENTION

The invention relates to a helicopter of the type having a servo flap carried by each main rotor blade for positioning the blade about its pitch axis, and deals more particularly with such a helicopter wherein each servo flap is a leading edge flap (that is, located in advance of the leading edge of its associated rotor blade) controlled by control signals generated by computer implemented means.

BACKGROUND OF THE INVENTION

The use of servo flaps for pitch positioning the blades of a helicopter main rotor is well known. For example, U.S. Pat. No. 3,095,931 shows a helicopter having a single four-bladed main rotor having a pitch positioning servo flap associated with each of the rotor blades; and U.S. Pat. No. 2,936,836 shows a helicopter having two two-bladed intermeshing main rotors with each blade of each rotor having a pitch positioning servo flap. In the past such servo flaps have customarily been located rearwardly of the trailing edges of their associated rotor blades. Such trailing edge flaps in combination with their associated rotor blades are essentially stable. That is, when the servo flap is moved about its own pitch axis the blade and flap move toward a balanced condition at which the pitch changing force applied to the blade by the servo flap is opposed by the aerodynamic pitch changing force applied to the blade.

Trailing edge servo flaps do, however, have the disadvantage that they work, in general, in opposition to the aerodynamic load requirements of their associated rotor blades. For example, when a rotor blade is required to be generating lift at high angles of attack, a trailing edge servo flap must produce a load in opposition to lift in order to properly position the blade. This negative lift from the servo flap decreases the overall lifting efficiency of the rotor system. If servo flaps are placed at the leading edges of the rotor blades rather than at the trailing edges they work, in general, in agreement with the aerodynamic load requirements of the rotor blades so that in comparison to a rotor having trailing edge servo flaps a rotor with leading edge servo flaps offers the possibility of substantially improving the overall efficiency of the rotor.

The possibility of increasing rotor efficiency through the use of leading edge servo flaps, or a combination of leading edge flaps and trailing edge flaps, has been recognized for some time, but past attempts at utilizing leading edge flaps have basically been unsuccessful, due largely to a rotor blade with a leading edge flap being a relatively unstable system. For example, if the rotor blade is to be moved to an increased pitch angle the leading edge servo flap must first be moved to an increased angle about its own pitch axis. Then as the rotor blade starts to move to the new pitch angle the lift on the servo flap is still further increased and will quickly drive the rotor blade beyond the desired pitch position unless the servo flap is moved soon enough in a compensating way. The control requirements for leading edge servo flaps are therefore complex and difficult to define and are of such nature as to be difficult to transmit to the servo flaps through swash plates and other customarily mechanical helicopter rotor blade control mechanisms.

U.S. Pat. No. 4,899,641 shows an electro-hydraulic helicopter control system wherein blade pitch control signals are transmitted to the blades as hydraulic signals transmitted through an hydraulic "slip-ring" or stationary-to-rotating interface essentially replacing the swash plate of a mechanical control system and overcoming the control limitations of a swash plate. In the system of said patent, rotor blade pitch control signals are computed from various real-time input signals, including pilot command signals and operating parameter signals and are converted from electrical signals output by the computer to hydraulic signals supplied to hydraulic actuators rotating with the rotor which directly control the pitch positions of the rotor blades. Associated with each blade pitch hydraulic actuator is a simulator, carried by the stationary structure of the helicopter, having identical characteristics to the real actuator and which simulator supplies a feedback signal defining the actual pitch position of the blade and used as one of the input signals to the computer which calculates the blade pitch position signals.

The object of the invention is, therefore, to provide a control system for a helicopter main rotor using servo flaps for pitch positioning the rotor blades and which increases the efficiency of the rotor by using leading edge servo flaps in place of the customary trailing edge servo flaps and which overcomes the stability problems previously associated with leading edge servo flaps.

In keeping with the aforegoing object, a more specific object of the invention is to provide a rotor blade pitch control system using leading edge servo flaps in combination with a control signal generating and transmitting system capable of generating the complex control signals required by the servo flaps and of transmitting them to rotor pitch actuators rotating with the blades.

Further objects and advantages of the invention will be apparent from the following detailed description of a preferred embodiment of the invention and from the accompanying drawings and claims.

SUMMARY OF THE INVENTION

The invention resides in a helicopter having at least one lifting or main rotor with two or more rotor blades, each of which blades is movable about a pitch axis extending longitudinally of the blade by a servo flap carried by the blade and which servo flap is located in advance of the leading edge of the blade in combination with a control system for the rotor blades including a computer implemented means, responsive to various pilot command and flight parameter input signals, for generating control signals transmitted electrically and-/or hydraulically to the rotor blades through an essentially non-mechanical stationary-to-rotating interface means to allow the servo flaps to receive the necessary complex control signals required by their leading edge dispositions.

The invention still further resides in the control signals generated by the computing means being signals defining the desired instantaneous pitch positions of the rotor blades, with each rotor blade having associated with it an active blade pitch stabilization means including a feedback means providing a negative feedback signal related to the pitch position of the associated blade, and which feedback signal is summed with the desired pitch position signals for that blade to produce an error signal, which may be converted from an electrical signal to an hydraulic signal, supplied to an actuator for pitch positioning the associated leading edge servo flap, thereby providing stability to the blade pitch changing system and reducing the complexity of the control signals needed to be generated by the computing means in comparison to the control signals which would be required if they were ones transmitted directly to the flap actuator in open loop fashion.

The invention also resides in further details mentioned in the appended claims.

BRIEF DESCRIPTION OF THE DRAWINGS

FIG. 1 is a perspective view of a helicopter having a rotor blade pitch control system embodying the present invention.

FIG. 2 is a fragmentary and partly schematic view of one of the rotor blades of FIG. 1.

DETAILED DESCRIPTION OF THE PREFERRED EMBODIMENT

Figure 3:
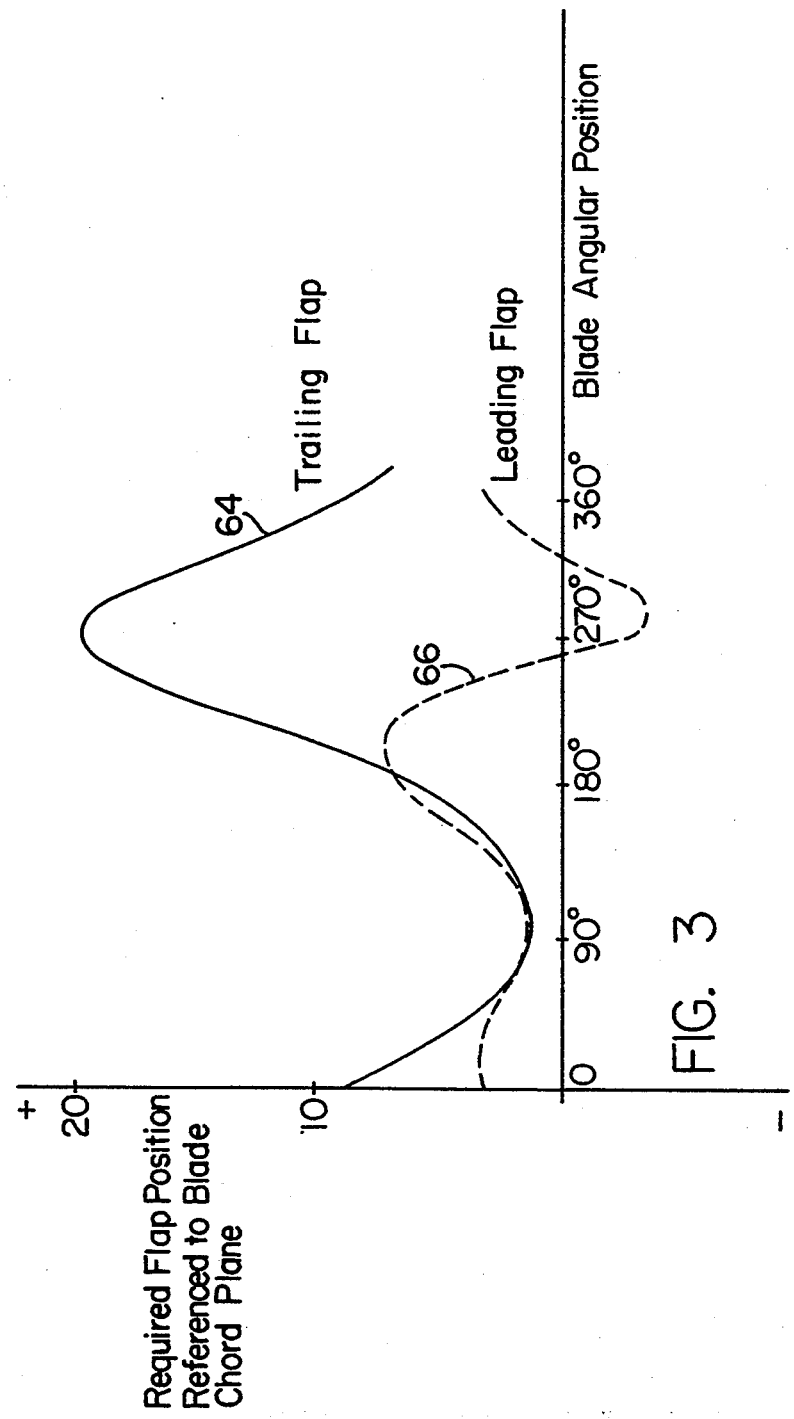
FIG. 3 is a graph showing the positions required to be assumed by a trailing edge servo flap and a leading edge servo flap, respectively, to obtain a given program of pitch positioning of an associated rotor blade throughout one revolution of the blade.

FIG. 1, by way of example, shows one helicopter, indicated generally at 10, having a rotor blade pitch control system embodying the present invention. This helicopter includes a body 12, a single main or lifting rotor 14, a tail rotor 16, and an engine 18. In the body 12 is a pilot's compartment 20 containing conventional pilot operable control instrumentalities including an air speed control lever 22 by means of which the pilot can provide a selectably variable desired air speed signal, a collective stick 24 by means of which the pilot can provide a selectively variable collective stick signal, and a cyclic stick 26 by means of which the pilot can provide a selectably variable cyclic stick signal.

The rotor 14 of the helicopter 10 has four blades 28 carried by a hub 30 rotatable, by a rotor shaft 29 to which it is attached, in the direction of the arrow A of FIGS. 1 and 2 about a generally vertical rotor axis 32 relative to the body 12, with each blade having a leading edge 31 and a trailing edge 33 referenced to rotation of the blade in the direction of the arrow A. Each blade 28 is connected to the hub by a means, indicated generally and schematically at 34 in FIG. 2, permitting the blade to move both in flapping directions and in lead and lag directions relative to the hub. Further, each blade 28 is movable relative to the hub about a pitch axis 36, extending along the length of the blade, to vary the pitch of the blade and to thereby vary the aerodynamic force imposed on the blade during its rotation about the rotor axis 32. In general the pitch of any one of the blades 28 does not remain constant throughout a revolution of the blade about the rotor axis, but instead it is continually varied throughout the revolution to meet different aerodynamic lifts required from it at different angular positions about the rotor axis.

As shown best in FIG. 2, to position it about its pitch axis 36 each blade 28 carries, near its outer end, a servo flap 38 which extends some distance along the length of the blade and is located so as to be positioned in advance of the leading edge 31 of the blade. The flap 38 is movable about a pitch changing axis 40 of its own relative to the blade 28, with the flap pitch axis 40 being parallel and fixed relative to the blade pitch axis 36. The particular means used to support the servo flap 38 from its associated blade 28 and the means for moving it relative to the blade about its own pitch changing axis 40 may vary widely without departing from the invention, and they are shown only schematically in FIG. 2. As so illustrated, the flap mounting means includes two brackets 42, 42 fixed to the blade 28 with the two brackets being located at the opposite ends of the flap and pivotally supporting the flap for movement about the axis 40. The means for moving the flap about the axis 40 includes an hydraulic actuator 44 having an operating rod 46 and a bell crank 48 connected between the actuator rod 46 and a link 50 pivotally connected to an arm 52 fixed to the flap 38. In FIG. 2 the hydraulic actuator 42 is for convenience shown outside of the blade 28 but preferably it is located inside of the blade with its cylinder or base end fixed to the blade. Also associated with each blade 28, as shown in FIG. 2, is an encoder or transducer 54 providing an electrical signal on the line 56 defining the angular position of the blade 28 about its pitch axis 36.

Hydraulic signals for actuating the actuator 44 are supplied by two hydraulic lines 58 and 60 either one of which, at any given time, may be an hydraulic pressure supply line with the other being a return line.

As evident from FIG. 2, the hydraulic lines 58 and 60 and the electric signal line 56 rotate with the rotor 30 about the rotor axis 32, and they are connected with other components of the control system contained in the body 12 of the helicopter through a stationary-to-rotating interface means 62 arranged concentrically with the rotor axis 32. This interface may take various suitable forms. For example, the portion of the interface dealing with hydraulic signals may be an hydraulic slip-ring basically similar to that of U.S. Pat. No. 4,899,641, and the portion dealing with electric signals may be formed by one or more electrical slip-rings selected from various well known types.

Before continuing with the description of the details of the control system, reference is made to FIG. 3 which provides a comparison between the control signals which on one hand need to be supplied to a trailing edge servo flap to move an associated rotor blade through a given program of pitch changes during the course of one revolution of the blade, and as might pertain to an actual flight situation, and the control signals which would have to be applied to a leading edge servo flap for the same blade and to achieve the same program of pitch changes. In particular, the line 64 indicates the pitch positions which would have to be assumed by a trailing edge flap and the line 66 indicates the positions which would have to be assumed by a leading flap 66. As can be seen, the control requirements for the trailing edge flap are relatively simple and have basically a one per rev type of oscillation that can be accommodated by mechanical control systems and transmitted through a swash plate or other type of mechanically implemented stationary-to-rotating interface means. The leading edge flap control requirements, indicated by the line 66, are however, substantially more complicated than those for the trailing edge flap and have a harmonic content above one per rev, including a large two per rev component, so that they cannot in general be transmitted to the rotating rotor blades through a swash plate type interface.

Although the control requirements for a leading edge servo flap are more complex than those for a trailing edge flap they are computable functions of a number of variables including pilot commands describing the desired motion of the helicopter and various parameters describing the operating condition of the helicopter and its physical characteristics. This means therefore that the control system can include a computer programmed to calculate and supply electrical control signals, which may be converted to hydraulic signals, directly representing the pitch positions to be assumed by the leading edge servo flap 38 at many successive instants during the course of the blade revolution about the rotor axis, and which signals are transmitted directly to the flap actuator 44.

In keeping with a further refinement of the invention, improved results and simplification of the calculation of the control signals by the computer are obtained by having the computer programmed to deliver control signals representing the desired pitch to be attained by each rotor blade itself at various instants of time during the course of its revolution about the rotor axis, and by providing an active pitch stabilization means for each blade which through the use of negative blade pitch position feedback converts the blade pitch signals to flap pitch signals to achieve the desired pitch positioning of the blade along with stability of the response.

Figure 4:
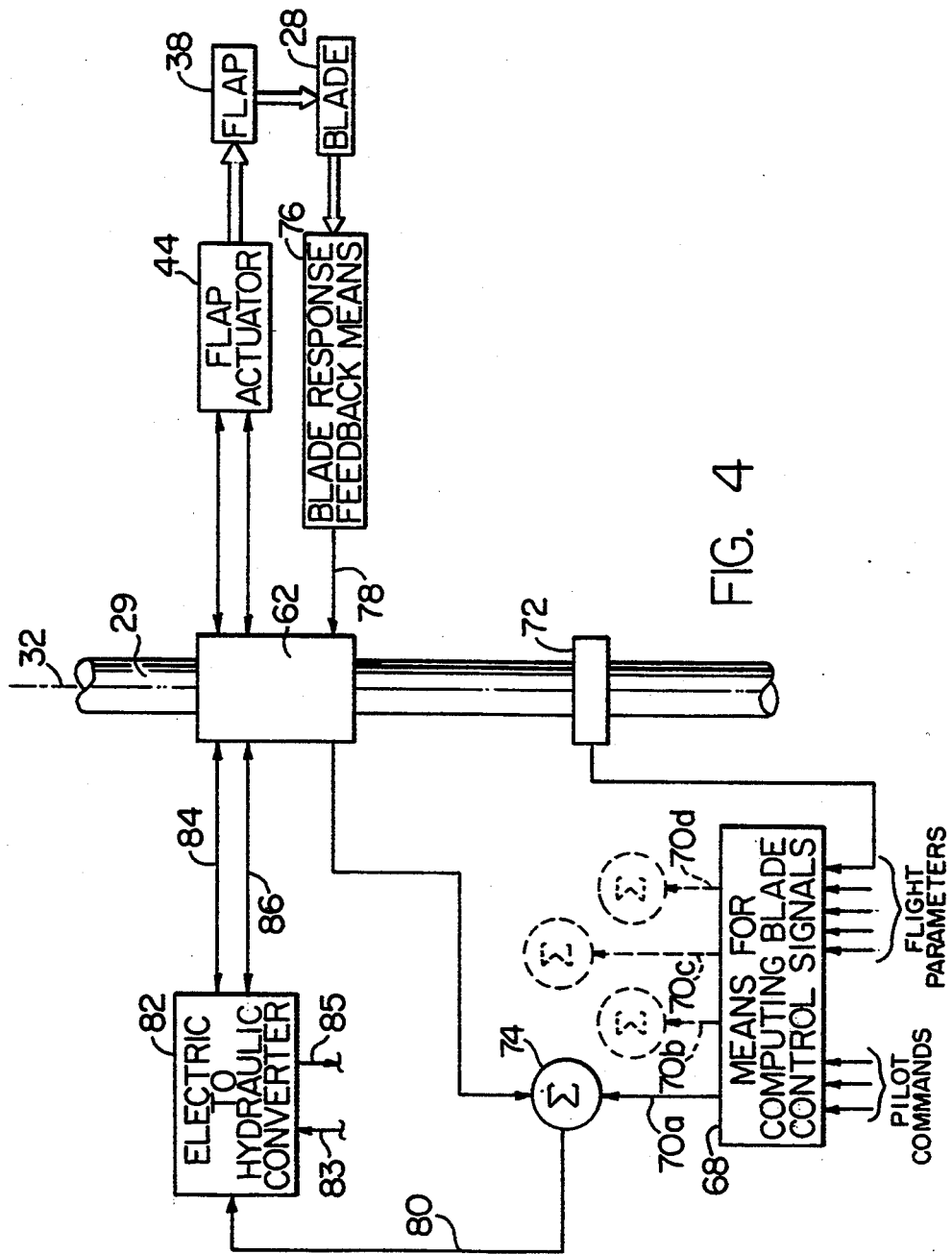
FIG. 4 is a schematic diagram of the control system of the FIG. 1 helicopter as applied to one of its rotor blades.

Turning now to FIG. 4, which shows the rotor blade pitch control system for the helicopter 10 of FIG. 1, the components illustrated to the left of the rotor shaft 29 are stationary ones contained in the body of the helicopter and those illustrated to the right of the rotor shaft are rotating ones which rotate with the rotor. In the body of the helicopter is a means 68 for computing control signals. This means includes a computer and continually computes and outputs control signals in accordance with pre-programmed algorithms as functions of various input signals defining quantities pertinent to the blade pitch control. As indicated in FIG. 4, these input signals may be divided into ones constituting pilot commands dictating a desired motion of the helicopter. These pilot commands may, for example, include an air speed signal, a collective stick signal and a cyclic stick signal provided by pilot operation of the air speed lever 22, collective stick 24 and cyclic stick 26 in the pilot compartment. In the case of an unmanned helicopter or a helicopter operating on autopilot these signals may be supplied by a remote and/or automatic control. The other set of input signals to the control signal computing means 68 are referred to in FIG. 4 as flight parameter signals and are ones describing pertinent present state flight conditions or physical characteristics of the helicopter and rotor blades. One such signal is a signal identifying the instantaneous position of the rotor 12 about the rotor axis 32 and is provided by an angular position detector 72 associated with the rotor shaft 29. Other of the flight parameter signals, may for example, be an altitude signal, signals from a gyroscope describing the attitude of the helicopter body in terms of roll, pitch and yaw and a rotor rotational speed signal.

In the illustrated control system of FIG. 4 the output of the control signal computing means 68 is four sets of rotor blade pitch control signals each of which sets is applied to a respective one of the blades over an associated one of the lines 70a, 70b, 70c and 70d. The portion of the control circuit utilizing the blade pitch control signals generated by the computing means 68 is the same for each blade and the components for only one blade are shown in FIG. 4.

The blade pitch control signals appearing on the line 70a are electrical signals which define the desired pitch of the associated blade 28 at a multitude of times or angular positions of the blade about the rotor axis during each revolution of the blade about the rotor axis. These blade pitch signals are applied to a summing circuit 74 which is part of an active stabilization system for the associated blade 28 and servo flap 38. Another part of this stabilization system is a blade response feedback means 76 which provides a negative feedback signal on the line 78 related to the pitch position of the blade 28 about its pitch axis 36. This feedback signal is transmitted through the stationary-to-rotating interface 62 to the summing circuit 74 where it is summed with the instantaneous blade pitch command signal appearing on the line 70a to provide an error or flap control signal on the line 80. If the flap actuator 44 were an electrically energized one this error signal could be amplified and supplied as an electric signal directly to the flap actuator. However, in FIG. 4 the flap actuator 44 is an hydraulically actuated signal; and therefore the electric error signal on the line 80 is converted to an hydraulic signal appearing on the hydraulic lines 84 and 86 for transmission to the flap actuator 44 through the stationary-to-rotating interface 62. The electric-to-hydraulic converter 82 is connected to a source of hydraulic pressure by a line 83 and to a drain by a line 85. Depending on the direction in which the flap actuator 44 is to be moved either one of the hydraulic lines 84 and 86 may be the pressure line with the other being the return line.

When the flap actuator 44 receives a signal from the lines 84 and 86 to move the blade 28 to a new pitch position it rotates the flap 38 about its pitch axis 40 in the proper direction to effect the desired pitch change of the rotor blade, and as the blade moves to the new position the feedback signal on the line 78 provided by the feedback means 76 changes so as to tend to null the error signal on the line 80 as the blade reaches the desired position. This active stabilization system for the blade 28 and flap 38 is rapid acting and provides the needed stability to the rotor blade pitch change function. It also significantly reduces the complexity of the output control signals needed to be generated by the control signal computing means 68.

Figure 5:
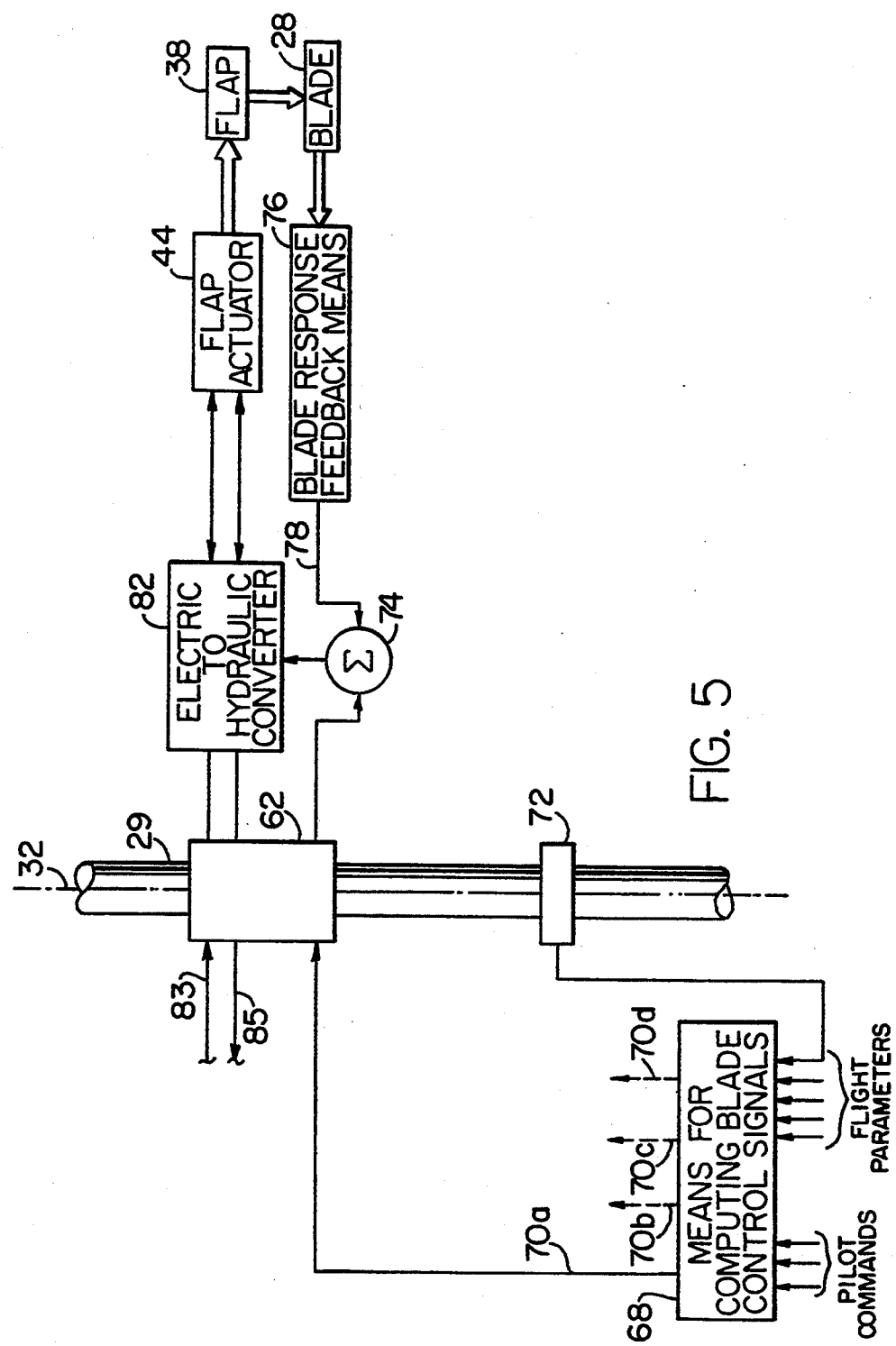
FIG. 5 is a view similar to FIG. 4 but showing an alternate form of the control system.

FIG. 5 shows a control system generally similar to that of FIG. 4 except that the electric-to-hydraulic converter 82 and the summing circuit 74 for each blade have been moved to the rotating side of the interface 62 so as to be rotatable with the rotor 14. The illustrated system of FIG. 5 is otherwise identical to that of FIG. 4 and therefore the same reference numbers as used in FIG. 4 have been used in FIG. 5 and the system need not be further explained.

I claim:

1. In a helicopter, the combination comprising:
a helicopter body,
a rotor rotatable in one direction relative to said helicopter body about a generally vertical rotor axis, said rotor including a hub and a plurality of elongated blades connected with said hub, each of said blades extending generally radially outwardly from said hub and being movable relative to said hub about a blade pitch axis extending along its length, each of said blades having a leading edge and a trailing edge with respect to rotation of said rotor in said one direction, a leading edge servo flap carried by each of said blades for positioning that blade about its blade pitch axis, said servo flap being located in advance of said leading edge of its associated blade with respect to rotation of said rotor in said one direction, said servo flap extending for some distance along the length of its associated blade and being movable relative to that blade about a flap pitch axis positioned generally parallel to the blade pitch axis of that blade, means providing a number of selectably variable command signals describing a desired flight condition for said helicopter, means providing a number of flight parameter signals describing actual present state operating parameters of said helicopter, a computer implemented means for calculating for each of said blades and from said control signals and said flight parameter signals a multitude of blade control signals occurring successively throughout the course of each revolution of the associated one of said blades about said rotor axis and which control signals may vary in accordance with a variation pattern having an harmonic content above one per revolution of the rotor, and plurality of servo flap positioning means each associated with a respective one of said blades and each separate from the other of said servo flap positioning means for positioning the servo flap carried by the associated one of said blades about its flap pitch axis relative to that blade, each of said servo flap positioning means being a closed loop means including a comparing means for comparing the actual position of the associated blade about its pitch change axis to the desired position dictated by said blade control signal for the associated blade to produce an error signal, and means controlling the position of the associated servo flap about its flap pitch axis in response to said error signal.

2. In a helicopter, the combination defined in claim 1 further characterized by said means providing a number of selectably variable command signals describing a desired flight condition for said helicopter being such that said number of selectively variable command signals include a cyclic stick signal, a collective stick signal and an airspeed signal.

3. In a helicopter, the combination defined in claim 1 further characterized by said means providing a number of flight parameter signals being such that said number of flight parameter signals include an altitude signal, gyroscope signals describing the attitude of said helicopter body in terms of roll, pitch and yaw, and a rotor rotational speed signal.

4. In a helicopter, the combination defined in claim 1 further characterized by said control signals for each blade being blade pitch command signals describing the desired instantaneous pitch of the associated one of said blades at successive points in its rotation about said rotor axis, said servo flap positioning means including a blade response feedback means for detecting the actual position of the associated one of said blades about its blade pitch axis and providing a negative feedback signal related thereto, and said comparing means being a summing means for summing said blade pitch command signals with said feedback signal to produce said error signal.

5. In a helicopter, the combination comprising:

a helicopter body, a rotor rotatable in one direction relative to said helicopter body about a generally vertical rotor axis, said rotor including a hub and a plurality of elongated blades connected with said hub, each of said blades extending generally radially outwardly from said hub and being movable relative to said hub about a blade pitch axis extending along its length, each of said blades having a leading edge and a trailing edge with respect to rotation of said rotor in said one direction, a leading edge servo flap carried by each of said blades for positioning that blade about its blade pitch axis, said servo flap being located in advance of said leading edge of its associated blade with respect to rotation of said rotor in said one direction, said servo flap extending for some distance along the length of its associated blade and being movable relative to that blade about a flap pitch axis positioned generally parallel to the blade pitch axis of that blade, a computer implemented means providing separately for each of said blades desired instantaneous blade pitch position signals representing the desired instantaneous pitch position of that blade relative to said hub and about its blade pitch axis at each of a multitude of instants of time during each revolution of said rotor about said main rotor axis and which blade pitch position signals may vary in accordance with a variation pattern having an harmonic content above one per revolution of the rotor, a plurality of detecting means each separately associated with a respective one of said blades for detecting the actual pitch position of its associated blade relative to said hub about its blade pitch axis at each of said instants of time and for producing an instantaneous feedback signal related thereto, and a plurality of comparing means each separately associated with e respective one of said blades for comparing, for each of said instants of time, said desired instantaneous pitch signal of its associated blade with said instantaneous feedback signal of the associated one of said detecting means to produce an instantaneous error signal, and a plurality of actuators each carried by a respective one of said blades for positioning the servo flap carried by the associated blade about its servo flap pitch axis in response to said error signal produced by the associated one of said comparing means and in such direction as to tend to null said error signal.

6. The combination defined in claim 5 further characterized by said helicopter including a means for generating an angular position signal representing the angular position of said hub about said rotor axis, and a means for generating a desired collective pitch signal and a desired cyclic pitch signal for said rotor, and said computer implemented means providing desired instantaneous pitch position signals being one which calculates said desired instantaneous pitch position signals as a function of a number of variables including said angular position signal, said desired collective pitch signal, and said desired cyclic pitch signal.

* * * * *